US005458034A

United States Patent [19]

Cavagna

[11] Patent Number: 5,458,034

[45] Date of Patent: Oct. 17, 1995

[54] APPARATUS FOR THE TRANSVERSE CUTTING OF MATERIALS OF VARIOUS TYPE, ESPECIALLY IN THE FORM OF RIBBONS

[75] Inventor: Elio Cavagna, Melegnano, Italy

[73] Assignee: Elio Cavagna S.r.l., Melegnano, Italy

[21] Appl. No.: 172,875

[22] Filed: Dec. 23, 1993

[30] Foreign Application Priority Data

Dec. 30, 1992 [IT] Italy ................................ MI92A2994

[51] Int. Cl.$^{6}$ .............................. B23D 19/06; B26D 1/18

[52] U.S. Cl. ............................. 83/488; 83/500; 83/508.3; 83/666; 83/676

[58] Field of Search .............................. 83/487, 488, 489, 83/500, 508.3, 665, 666, 676, 56

[56] References Cited

U.S. PATENT DOCUMENTS 516,026 3/1894 Seaver ...................................... 83/489
1,750,338 3/1930 Weiss ........................................ 83/489
2,777,521 1/1957 Tanis ...................................... 83/488 X
3,081,661 3/1963 MacPherson ............................ 83/676
3,211,066 10/1965 Palamenti ............................. 83/678 X
5,097,732 3/1992 Tahara ............................... 83/508.3 X

*Primary Examiner*—Rinaldi I. Rada
*Assistant Examiner*—Clark F. Dexter
*Attorney, Agent, or Firm*—Bucknam and Archer

[57] ABSTRACT

An apparatus suitable to perform the transverse cutting of various materials, especially, but not exclusively, in the form of ribbons, such as, for instance, aluminium films, paper, fiberglass, plastic films and the like comprises two circular blades, slightly spaced from one another, each blade being suitable to engage with the relevant circular counter-blades; such blades and counterblades being supported by a carriage travelling on a beam and whose traverse is caused by mechanisms, which are also connected to the carriage. These blades, counterblades, carriage and beam are placed transversally and orthogonally with respect to the feed table of the material to be cut.

9 Claims, 2 Drawing Sheets

APPARATUS FOR THE TRANSVERSE CUTTING OF MATERIALS OF VARIOUS TYPE, ESPECIALLY IN THE FORM OF RIBBONS

FIELD OF THE INVENTION

This invention relates to an apparatus for the transverse cutting of material of various type, especially, but not exclusively, in the form of ribbons, such as, for instance, aluminium films, fiberglass, paper, plastic films, and the like.

BACKGROUND OF THE INVENTION

Apparatuses of this kind are already known in the prior art. A first type of apparatus comprises a couple of counter-rotating cylinders whose length is basically equal to the width of the material to be cut.

A blade is fixed longitudinally on one of the cylinders, projecting from it, while a longitudinal groove is provided on the second cylinder, the length of said groove equating the length of the blade. At each complete turn of the cylinders, the blade penetrates in the groove, cutting the material. Fine tuning these kinds of apparatuses is a critical operation, especially as concerns the penetration of the blade in the groove, which depends directly on the rotational velocities of the cylinders being equal.

Besides, their synchronism must be maintained in time, which cannot always be achieved, for instance due to wear phenomena of the movement transmission gears and the supports. The correct calculation of the groove size is a further serious problem which arises in designing these apparatuses, as the cutting blade does not enter and exit from it in a perfectly radial way, but with a movement component having a tangent direction.

The groove width must be just such as to permit this movement and not larger, otherwise the cutting operation would be jeopardized. It should also be stressed that in this first type of known apparatus, all the fine tuning operations bring about a remarkable waste of time.

A second type of known apparatus provides for a transverse guillotine cutting.

This second type of apparatus has basically the same drawbacks as the one of the first type.

Besides, these known apparatuses have a complex and bulky structure which limits or at least complicates their maintenance.

SUMMARY OF THE INVENTION

There has now been found, and it is the subject of this invention, an apparatus for the transverse cutting of different materials, such as those exemplified hereinabove, which permits to eliminate all the drawbacks of traditional apparatuses. One of the main objects of this invention is therefore an apparatus for the transverse cutting of various materials, which does not require the long and complex fine tuning operations of the known apparatuses.

A further object of this invention 24 is to provide an apparatus of the type mentioned hereinabove constituted by a simplified and much less bulky structure.

Thanks to still a further characteristic of the apparatus according to this invention, the transverse cutting and/or shearing is made in a precise and rapid way, making the work output remarkably higher.

BRIEF DESCRIPTION OF THE DRAWINGS

These and still further objects, advantages and characteristics of the transverse cutting apparatus according to this invention shall be made clearer by the following detailed disclosure of a preferred embodiment, to be construed as a non limiting example, with reference to the enclosed drawings, wherein.

DETAILED DESCRIPTION

Figure 1:
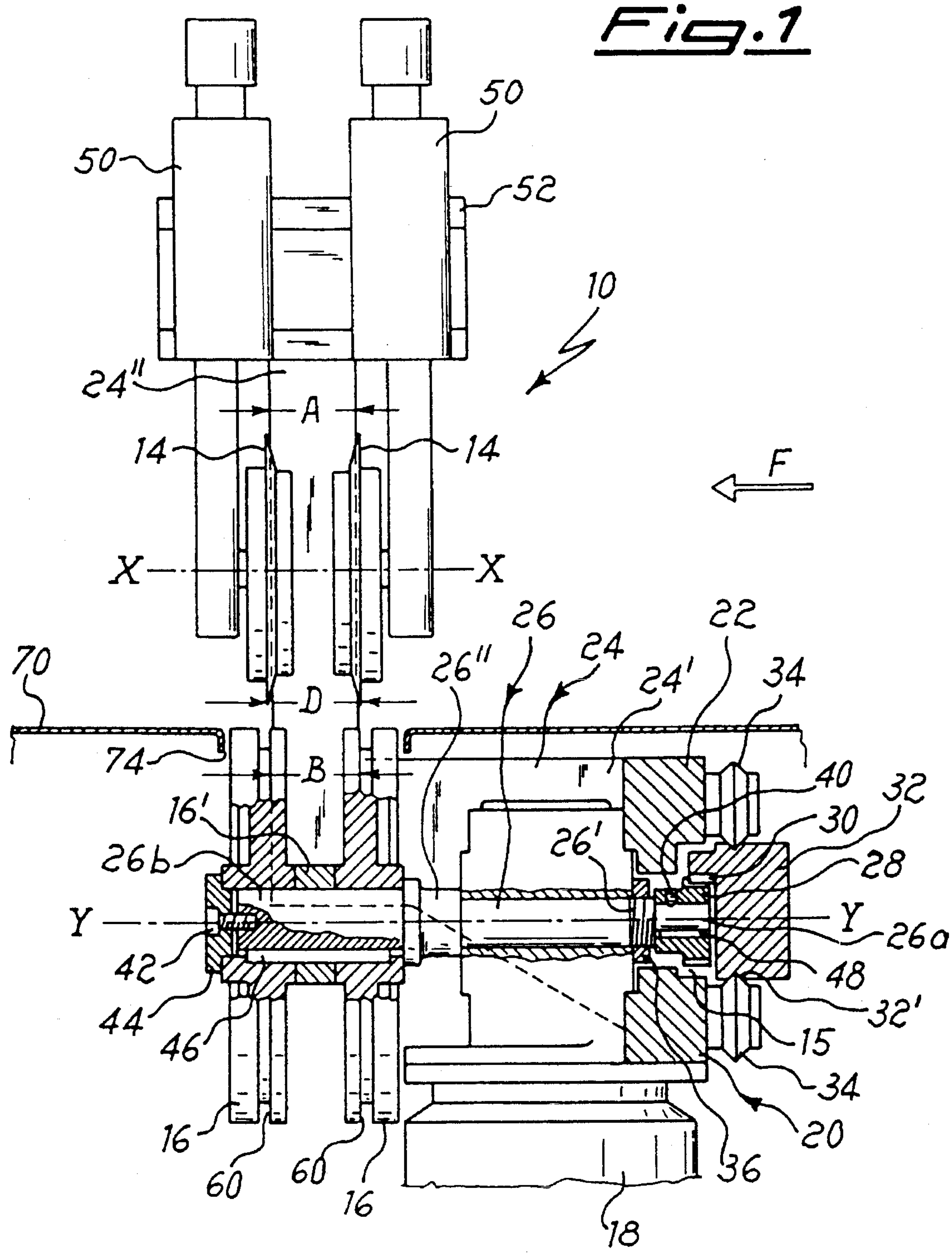
FIG. 1 is a front view, with sectioned parts, of the apparatus according to this invention.
Figure 2:
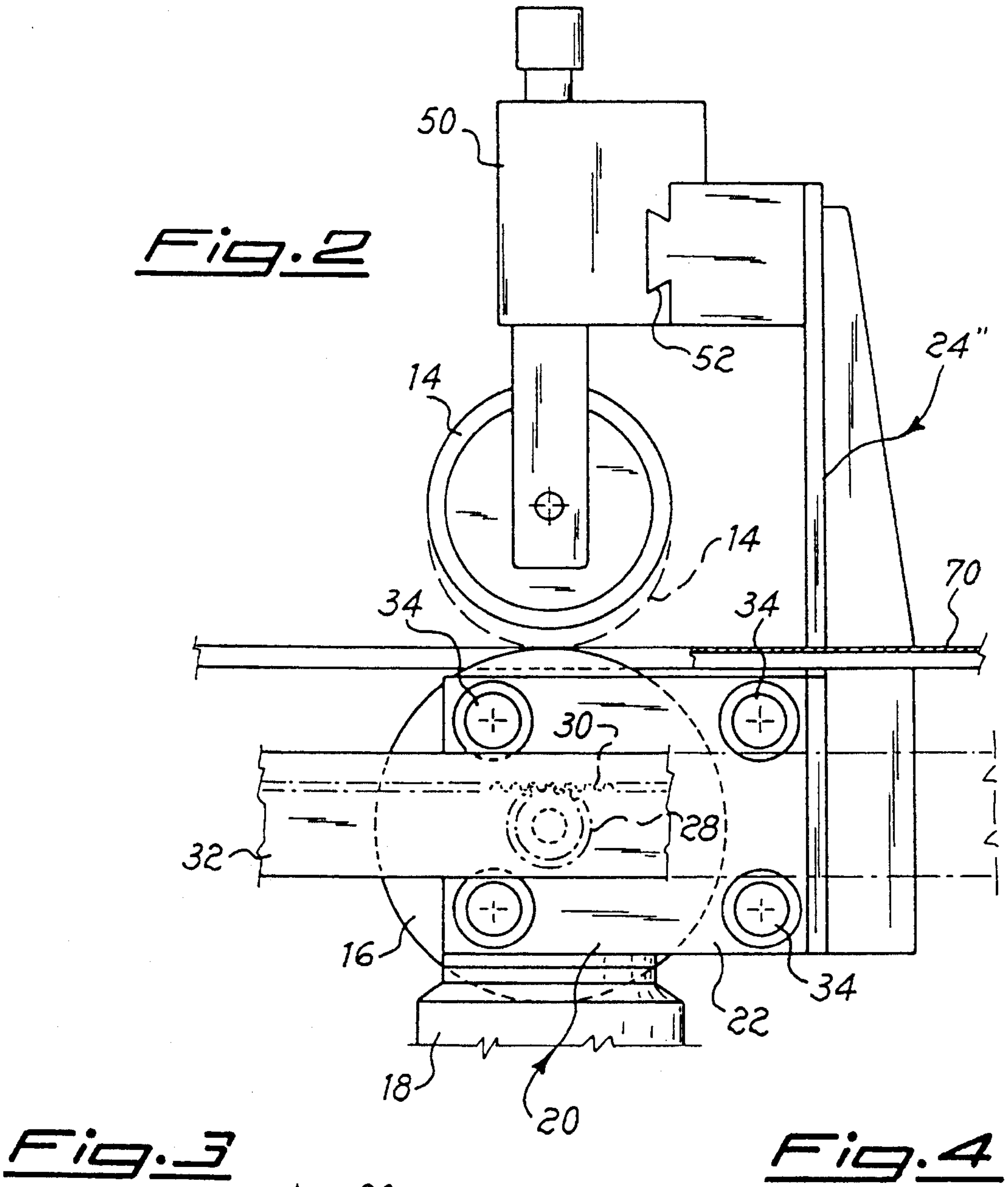
FIG. 2 is a view of the apparatus of FIG. 1 according to the arrow F.

With reference first to FIG. 1 and FIG. 2, the apparatus according to this invention, indicated as a whole by the numeral 10 and illustrated during the working stage, includes a couple of circular blades 14 and the relevant circular counter-blades 16, as well as a gear motor 18, which are characteristically supported by a carriage 20 moving on a beam 32, as specified hereinafter. This carriage 20 is basically constituted by a first almost rectangular plate 22 to which a second L-shaped plate is connected in any of the ways known in the art.

Such connection is made, through the horizontal side 24' of the second plate 24, with the end of the shorter vertical side of the first plate 22, while the vertical side 24" of the second plate 24 is suitable to support the couple of circular blades 14, as specified hereinafter.

The first almost rectangular plate 22 of carriage 20 is integral with gear motor 18 from which a shaft 26 projects on whose opposite ends the couple of circular counter-blades 16 and a pinion 28 are keyed respectively, the latter being suitable to engage, through a passage 15 provided in the plate 22, with a rack 30 provided on beam 32.

Shaft 26 is axially connected to the opposite ends of a connecting portion of gear motor 18 by means of a ring nut or the like 36 screwed on a threaded portion 26' of the same and by the contrast of another portion 26" of the same having a greater cross section, respectively. Beyond said parts 26' and 26", shaft 26 projects into further opposed portions *26a* and *26b* of said smaller cross sections suitable to hold pinion 28 and the couple of circular counterblades 16, respectively.

Pinion 28 and the circular counter-blades 16 are in turn axially connected to the relevant portions *26a* and *26b* of shaft 26 by screws 40 and 42; the latter, which are inserted in a washer or the like 44, cause said circular counter-blades 16 to contrast with the portion of greater cross-section 26" of said shaft 26.

Besides, the circular counter-blades 16 and pinion 28 are torsionally connected to shaft 26 by keys or the like 46 and 48, respectively.

The supports 50 of the circular blades 14 are supported by the vertical side 24" of the second plate 24 of carriage 20 and are associated to the supports 50 of the circular blades 14, the supports 50 being inserted in a way 52 integral with the upper end of the vertical side 24" and placed horizontally with respect to the same, so that the edge of said circular blades cooperates, in the work process, with the relevant underlying circular counter-blades 16, effecting the so called shear-cutting of the material. To this aim, each circular counter-blade 16 is provided with a peripheral groove 60 in which a side peripheral portion of the relevant circular blade 14 engages. According to a basic characteristic of the apparatus subject matter of this invention, the circular blades 14 are spaced from one another by a "D" value equal or slightly greater than the "A" width (FIG. 1) of the vertical side 24" of plate 24.

Accordingly, said "D" distance of the circular blades 14 is slightly greater than the "B" distance of the relevant underlying grooves 60 of the circular counter-blades 16.

The values of these distances are critical for a perfect working of the apparatus, In other words, the circular counter-blades 16 are spaced from one another, by means of distance piece 16' of a value suitable to permit the engagement, in the working stage, of the above-lying circular blades 14 in the relevant grooves 60 of said circular counter-blades 16.

A perfect spacing of the circular blades 14 with respect to grooves 60 can be advantageously and easily obtained by shifting their supports 50 on ways 52.

Always advantageously, the horizontal X—X axis of the circular blades 14 and the horizontal Y—Y axis of the circular counter-blades 16 coincide with the relevant vertical axes.

A plurality of wheels 34 are associated to plate 22 of carriage 20, these wheels 34 being suitable to engage in grooves and/or ways provided on the upper and lower sides of beam 32, causing a perfect placing of said carriage 20 on said beam 32 and making its traverse during the working stage easier.

Figure 3:
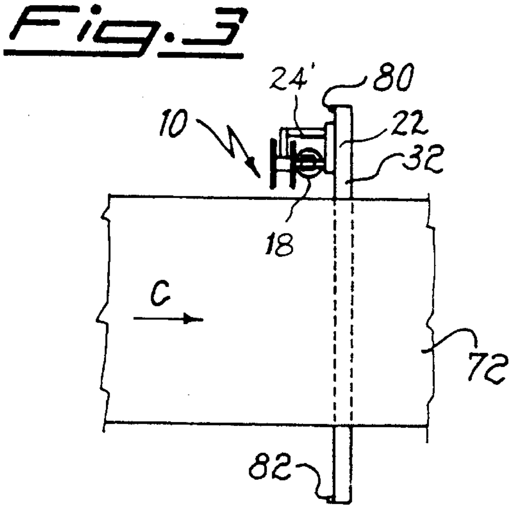
FIG. 3 and FIG. 4 are plans of the apparatus of FIG. 1 in the beginning stage of the transverse cutting and in the end stage of the same, respectively.
Figure 4:
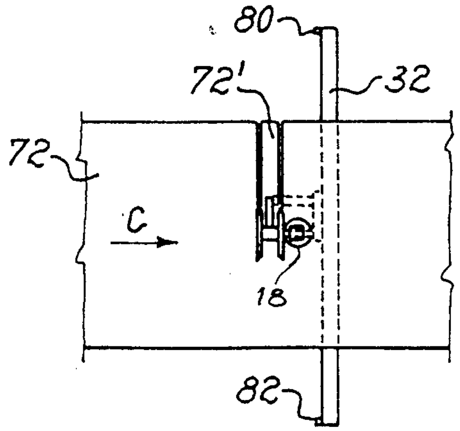

The following is a short description of the way the apparatus 10 works according to this invention, reference being also made to FIG. 3 and FIG. 4.

Beam 32 is placed underneath and orthogonally with respect to a table 70, provided with a transverse opening 74, on which is fed or placed the material 72 to be cut transversally.

Now, the circular blades 14, one of which is indicated by a dotted line in FIG. 2, are caused to descend by any known means which is not illustrated; then gear motor 18 is operated, which causes the rotation of shaft 26 and, consequently, of pinion 28 and the circular counter-blades 16, which in their turn entrain in the rotation the circular blades 14.

Pinion 28, engaging with rack 30, causes the traverse of carriage 20 on beam 32, starting in this way the transverse cutting of material 72, fed according to the "C" arrow, whose swarf 72' passes through opening 74 of table 70, without hindering the cutting work stage.

Upon termination of the cutting, and reversing the rotation of shaft 26, the apparatus 10 returns to the starting position, FIG. 3.

The traverse of carriage 20 on beam 32 is delimitated by end-of-stroke blocks 80, 82, shown schematically in FIG. 3 and FIG. 4.

Lastly, it should be stressed, as mentioned hereinabove, that the "D" distance of the circular blades 14 characteristically effects a transverse cut of material 72 of such a width as to permit the passage through said material 72 of the vertical side 24" of the second plate 24, i.e. where said circular blades 14 are supported.

The hereinabove disclosure clearly shows the advantages as well as the useful results ensuing from the apparatus according to this invention, which permits to make transverse shear-cuttings of various materials in a very precise and reliable way compared to the complicated and bulky apparatuses of the prior art. Lastly, it is clear that variants and/or changes can be introduced in the apparatus, all falling within the scope of protection of this invention.

I claim:

1. An apparatus for transversely cutting in the form of ribbons a material (72) including aluminum fibers, paper, fiberglass, and plastic fibers, said material being fed along a first direction, said apparatus comprising a pair of circular blades (14) carried on supports (50) therefor, a pair of circular counterblades (16), a carriage (20) supporting said supports (50) and said counterblades, means for causing said carriage to traverse along a beam (32) in a direction transverse to said first direction of the material to be cut, said means for causing said carriage to traverse being also adapted to move said counterblades (16), said carriage (20) consisting of a first rectangular plate (22), a second "L"-shaped plate (24) connected to said first plate (22), said first plate (22) supporting said means for causing said carriage (20) to traverse along said beam and supporting said pair of circular counterblades (16), and said second plate (24) supporting said supports (50) and said pair of circular blades (14), said second plate (24) having a horizontal side (24') and a vertical side (24"), said vertical (24") having an upper end, said said horizontal side (24') of said second plate being connected to said first plate (22), said vertical side (24") of said second plate supporting said supports (50)' of said circular blades (14), said supports (50) being inserted in a way (52) integral with the upper end of said vertical side (24") of said second plate, and wherein said circular blades (14) have an X—X horizontal axis of rotation, said counterblades (16) have a horizontal axis of rotation Y—Y, said X—X axis being parallel to said Y—Y axis and said beam (32) being disposed transverse to said X—X and Y—Y axes, wherein each circular counterblade (16) has an annular groove (60) and each of the circular blades (14) engages a corresponding one of said grooves (60) during a working stage, the circular blades (14) being spaced from each other a distance "D" slightly greater than a distance "B" between said grooves (60) of the circular counterblades (16), said distance "D" between the circular blades (14) being equal to or slightly greater than a width "A" of the vertical side (24") of the second plate (24) of said carriage (20), whereby a transverse cut of said material (72) is obtained of such a width as to permit the passage through said material (72) of said vertical side (24") of said second plate (24).

2. The apparatus according to claim 1, wherein said means for causing said carriage (20) to traverse consist of a gear motor (18) which is integral with said first plate (22), a shaft (26) which projects from said first plate (22) and is axially rotated by said gear motor (18), said shaft (26) having a first end and a second end, said counterblades (16) being keyed to said first end, a pinion (28) being keyed to said second end, said first plate (22) having a passage (15), said beam (32) having a rack (30), said shaft (26) passing through said passage (15) so that said pinion (28) engages said rack (30) during operation.

3. The apparatus according to claim 2, wherein said shaft (26) has a first threaded portion (26') and a second portion (26") of cross section larger than said first threaded portion, said gear motor (18) a connecting portion having has two ends, said shaft (26) is connected to one end of said gear motor (18) by means of a ring-nut (36) screwed on said first threaded portion (26').

4. The apparatus according to claim 3, wherein said shaft (26) extends beyond said first portion (26') and said second portion (26") to form a third portion (**26*a*) and a fourth portion (26*b*), respectively, and said counterblades (16) and said pinion (28**) each engage with one of said third and fourth portions.

5. The apparatus according to claim 4, wherein a distance piece (16') is inserted on said fourth portion (**26*b*) of said shaft (26) between said counterblades and the distance between said counterblades (16) is determined at least in part by said distance piece (16'), and the distance between the circular blades (14) is adjusted by shifting said supports (50) along the way (52**).

6. The apparatus according to claim 2, wherein the material (72) is placed on a table (70), said table being provided with a transverse opening (74).

7. The apparatus according to claim 6, wherein said gear motor (18) in operation causes both a traverse of said carriage (20) along said beam (32) and a rotation of said circular counterblades (16), said circular blades (14) during operation engage with said counterblades (16) whereby a cutting of material said (72) is obtained, a swarf (72') thereof passing through said opening (74) of said table (70).

8. The apparatus according to claim 7, wherein the said beam (32) has end-of-stroke blocks (80,82) and the traverse of said carriage (20) along said beam (32) is delimitated by said end-of-stroke blocks (80,82).

9. The apparatus according to claim 1, wherein grooves (32') are provided in an upper side and in a lower side of said beam (32), a plurality of wheels (34) are arranged on said first plate (22) of carriage said (20), said wheels engaging with said grooves (32') whereby positioning of said carriage (20) on said beam (32) is obtained and the traverse of said carriage is facilitated.

* * * * *